United States Patent
Holler

(10) Patent No.: US 6,554,433 B1
(45) Date of Patent: Apr. 29, 2003

(54) OFFICE WORKSPACE HAVING A MULTI-SURFACE PROJECTION AND A MULTI-CAMERA SYSTEM

(75) Inventor: Mark Holler, Palo Alto, CA (US)

(73) Assignee: Intel Corporation, Santa Clara, CA (US)

(*) Notice: Subject to any disclaimer, the term of this patent is extended or adjusted under 35 U.S.C. 154(b) by 136 days.

(21) Appl. No.: 09/608,885

(22) Filed: Jun. 30, 2000

(51) Int. Cl.⁷ .................. G03B 21/14; G03B 21/26; G03B 21/00; G03B 21/56; H04N 7/14
(52) U.S. Cl. .................. 353/79; 353/28; 353/94; 353/122; 348/744; 348/14.07; 359/443; 359/460
(58) Field of Search .................. 353/79, 120, 94, 353/122, 28, 119; 348/14.01, 14.07, 14.16, 14.11, 744; 352/89, 47; 359/443, 460

(56) References Cited

U.S. PATENT DOCUMENTS

| | | | | |
|---|---|---|---|---|
| 5,394,198 A | * | 2/1995 | Janow | 348/744 |
| 5,612,734 A | * | 3/1997 | Nelson et al. | 348/20 |
| 5,619,254 A | * | 4/1997 | McNelley | 348/20 |
| 5,665,155 A | * | 9/1997 | Mersereau | 348/20 |
| 5,940,119 A | * | 8/1999 | Platte et al. | 348/16 |
| 5,953,052 A | * | 9/1999 | McNelley et al. | 348/20 |
| 5,953,053 A | * | 9/1999 | Chen et al. | 348/20 |
| 6,122,865 A | * | 9/2000 | Branc et al. | 52/36.1 |
| 6,209,266 B1 | * | 4/2001 | Branc et al. | 52/36.1 |
| 6,292,211 B1 | * | 9/2001 | Pena | 348/14.08 |
| 6,313,867 B1 | * | 11/2001 | Shmakawa | 348/51 |
| 2002/0063774 A1 | * | 5/2002 | Hillis et al. | 348/14.01 |

OTHER PUBLICATIONS

"Projection Displays", Edward H. Stupp and Matthew S. Brennesholtz, 1999, John Wiley and Sons, Ltd., pp. 144–146.*

Pierre Wellner, "Interacting With Paper On The Digitaldesk", Communications of the ACM, Jul. 1993/vol. 36, No. 7, pp. 86–96.

John Underkoffler, Brygg Ullmer, and Hiroshi Ishii, "Emancipated Pixels: Real–World in the Luminous Room", MIT Media Laboratory, Computer Graphics Proceedings, Annual Conference Series, 1999, pp. 385–392.

Ramesh Raskar, Greg Welch, Matt Cutts, Adam Lake, Lev Stesin and Henry Fuchs, "The Office of the Future: A Unified Approach to Image–Based Modeling and Spatially Immersive Displays", Computer Graphics Proceedings, Annual Conference Series, 1998. pp. 179–188.

Jun Rekimoto and Masanori Saitoh, "Augmented Surfaces: A Spatially Continous Work Space for Hybrid Computing Environments", Sony Computer Science Laboratories and Department of Computer Science, Keio University.

* cited by examiner

Primary Examiner—Russell Adams
Assistant Examiner—Melissa J. Koval
(74) Attorney, Agent, or Firm—Blakely, Sokoloff, Taylor & Zafman LLP

(57) ABSTRACT

According to one embodiment of the invention, an apparatus is provided that includes a projection screen located on a wall of a workspace. The apparatus also includes a frontal-view camera located behind the projection screen. The frontal view camera captures a frontal-view image of the workspace through a hole in the projection screen. Additionally, the apparatus includes a projector to project an image of an individual outside the workspace onto the projection screen, such that the hole is located within a face of the image of the individual.

29 Claims, 18 Drawing Sheets

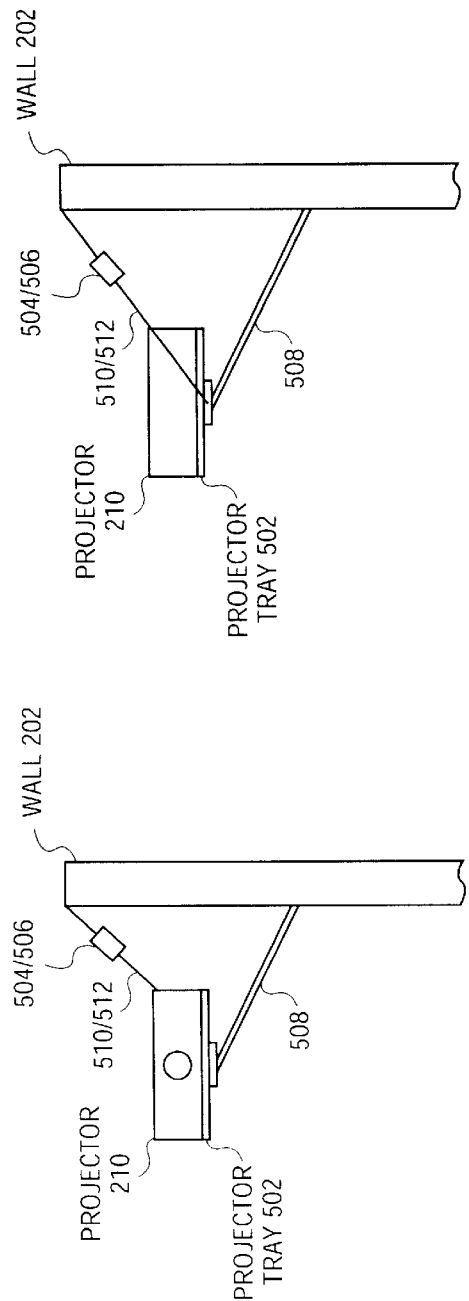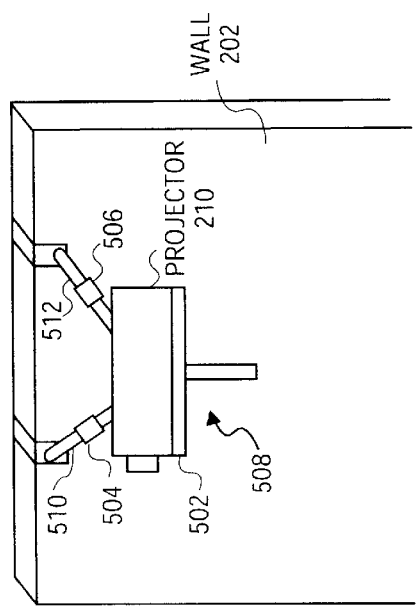
FIG. 5A
FIG. 5B
FIG. 5C

OFFICE WORKSPACE HAVING A MULTI-SURFACE PROJECTION AND A MULTI-CAMERA SYSTEM

FIELD

The invention relates to office workspace. More specifically, the invention relates to a multi-surface projection system with multi-camera input for such an office workspace.

BACKGROUND

As companies and corporations continue to grow and increase in employment, office space as well as worker efficiency become more important commodities. Accordingly, the design and use of office spaces, such as cubicles or walled offices, become a priority for such companies and corporations.

Current approaches to such designs of office space include the incorporation of projectors and cameras to replace and supplement portions of an office worker's computer workstation. For example, the computer monitor can be replaced by a projector system such that the computer screen can be projected onto a wall of the office, thereby eliminating the need to have a computer monitor in the office workspace. Accordingly, this increases the amount of workspace for an office worker without increasing or even decreasing the actual size of the office. Moreover, this approach increases the viewing area of the computer screen thereby allowing the office worker to become more efficient, as multiple applications can be viewed at one time.

However, typical approaches to such designs place the projectors off-angle to the project screen. For example, one such approach is to mount the projectors on the ceilings above the projection screens. However, when projectors are off-angle, the projections are often distorted. In particular, this off-angled projection causes what is termed "keystoning." A projection that is "keystoned" is trapezoidal in nature. In particular, FIGS. 1a–1b illustrate a projection that is "keystoned" due to the projector being off-angle from the projection screen. FIG. 1a includes projector 102 projecting projection 106 onto projection screen 104. Projector 102 is above and thus off-angle from projection screen 104. Accordingly, as illustrated in FIG. 1b, the image produced onto projection screen 104 is shaped like a trapezoid, which causes the image to be distorted and out-of-focus.

Further, current approaches incorporate cameras into the office space to provide for video conferencing capability. With regard to video conferencing capability, a typical approach includes the placement of a camera on the top of the computer monitor from which a user is working, thereby allowing the users to view one another as they are working at their respective computers. Disadvantageously, the cameras employed in such embodiments are inherently wide-angled in order to be able to capture the user's image due to the closeness of the camera to the user, thereby causing fish-eye distortion typically associated with wide-angle lenses. Moreover, because the user looks at the monitor screen rather than the camera, the camera does not capture an eye-contact view, which is important in video-based interactions.

Another typical approach for the incorporation of cameras into the office space to provide for video conferencing capability is to mount the cameras on the ceiling above the workspace. However, this set-up still does not provide for gaze awareness and eye contact between individuals involved in the videoconference.

Accordingly, the current approaches to the projection/camera-based office workspace lack the proper integration of projectors and cameras into such workspaces to provide video conferencing that minimizes the distortion while providing a better facial perspective and providing gaze awareness among the individuals involved in the video conference. Moreover, current approaches to the projection/camera-based workspace fail to provide undistorted projections onto the projection screens of the workspace as well as other limitations.

BRIEF DESCRIPTION OF THE DRAWINGS

Embodiments of the invention may be best understood by referring to the following description and accompanying drawings which illustrate such embodiments. In the drawings

FIGS. 5a–5c illustrate another embodiment for placement of projectors 210 and 212;

DETAILED DESCRIPTION

In the following description, numerous specific details are set forth to provide a thorough understanding of the invention. However, it is understood that the invention may be practiced without these specific details. In other instances, well-known structures and techniques have not been shown in detail in order not to obscure embodiments of the present invention.

Figure 1A:
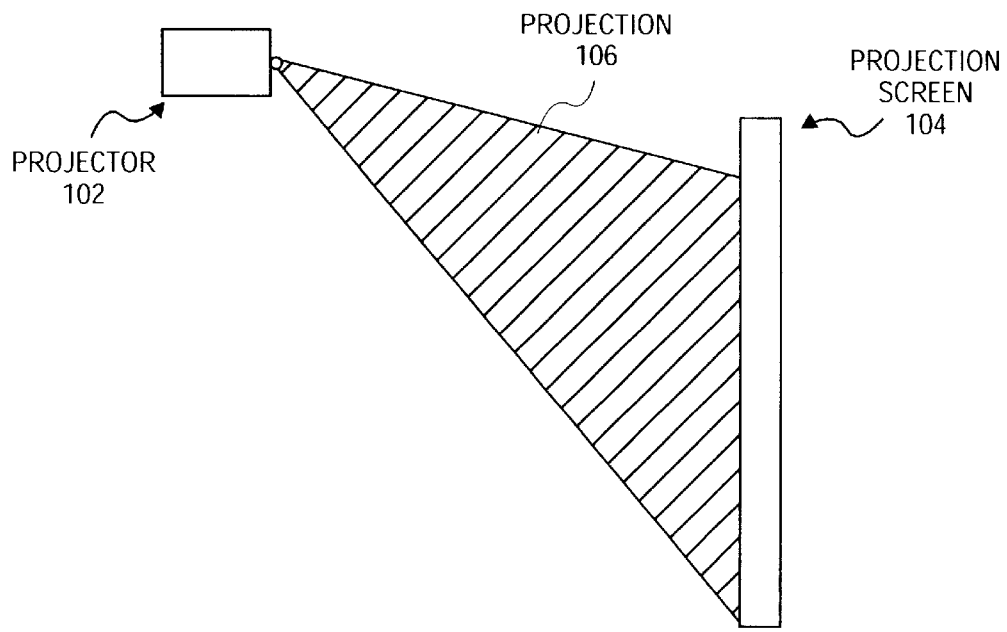
FIGS. 1a–1b illustrate a projection that is "keystoned" due to the projector being off-angle from the projection screen.
Figure 1B:
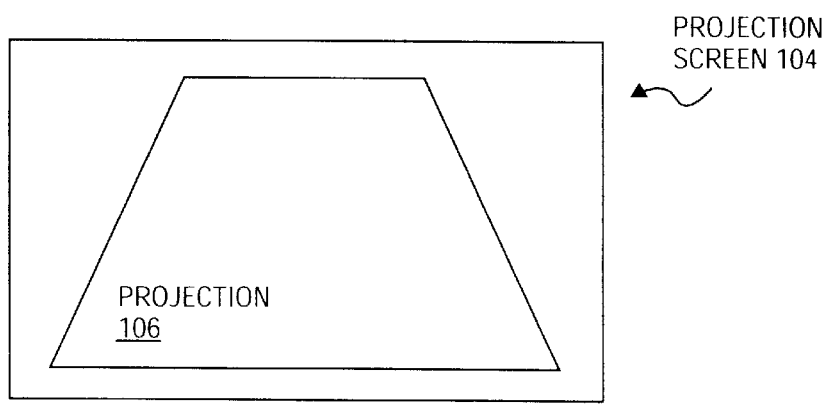
Figure 2A:
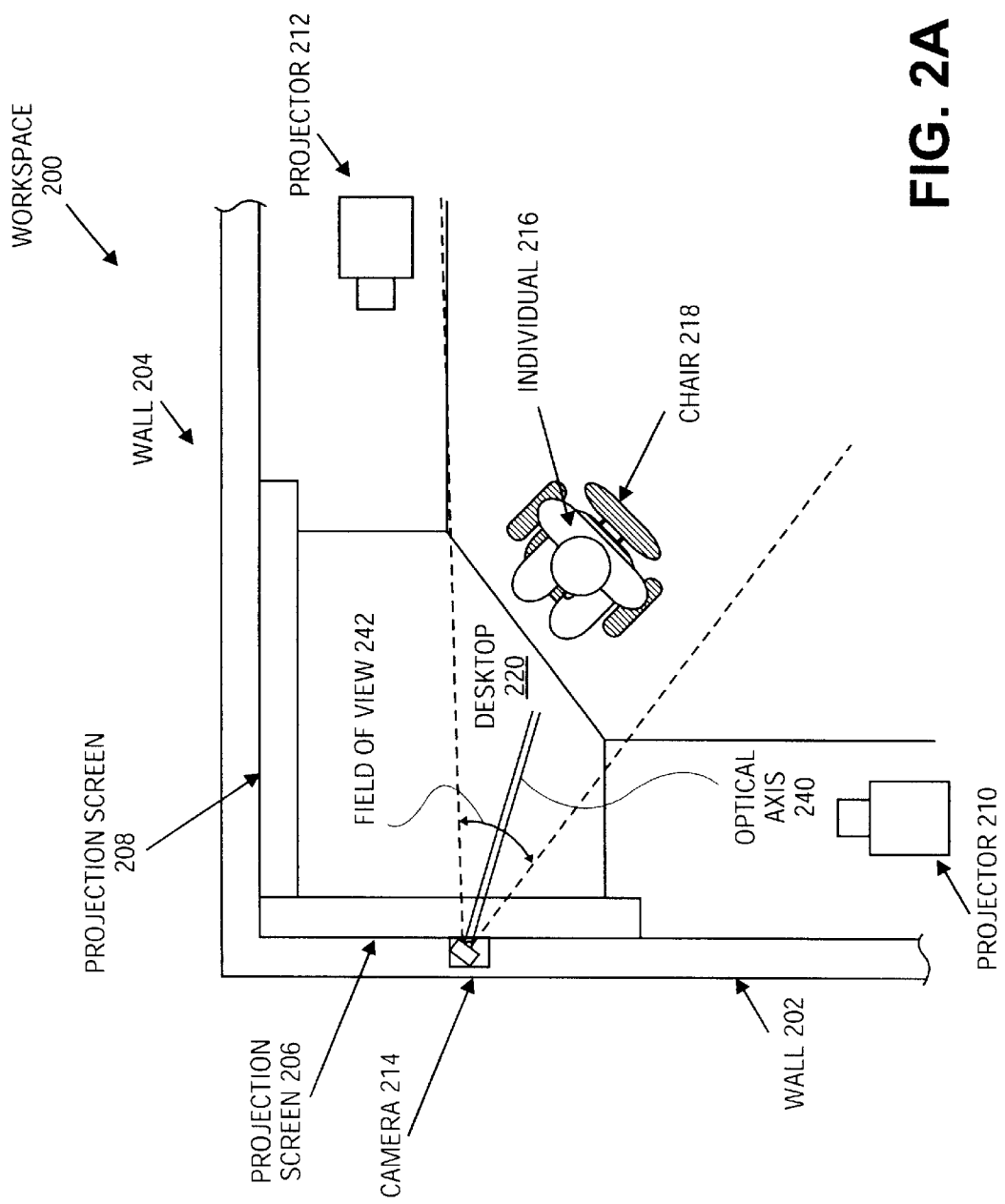
FIGS. 2a–2b show respectively a top-view and a side-view of a workspace, according to embodiments of the present invention.
Figure 2B:
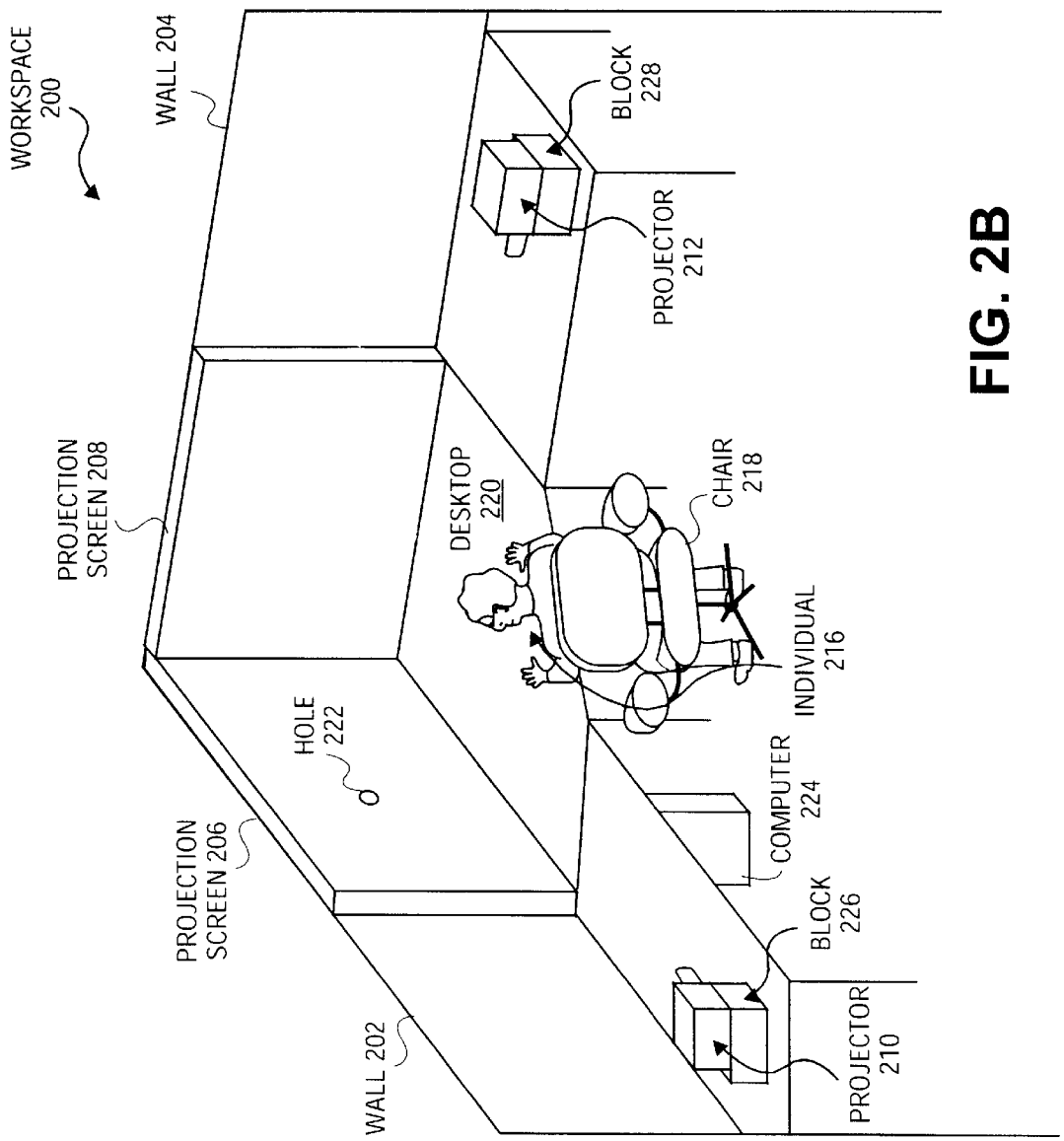

FIGS. 2a–2b show respectively a top-view and a side-view of a workspace, according to embodiments of the present invention. In particular, FIGS. 2a–2b illustrates a top-view and a side-view, respectively, of workspace 200 with individual 216 sitting in chair 218 and using workspace 200. Workspace 200 includes walls 202 and 204, projection screen 206 having hole 222, projection screen 208, projectors 210 and 212, frontal-view camera 214, desktop 220 and computer 224. Computer 224 is coupled to and communicates with projectors 210 and 212 and frontal-view camera 214 through, for example, parallel, serial or other types of communications, which are known in the art. In one embodiment, desktop 220 also displays a screen image of computer 224 from a projector overhead (not shown), which is described in more detail below.

As shown, projection screens 206 and 208 are mounted onto walls 202 and 204, respectively. Moreover, frontal-view camera 214 is located in a niche in wall 202 behind projection screen 206, wherein the lens of frontal-view camera 214 is behind hole 222 of projection screen 206. In particular, optical axis 240 of frontal-view camera 214 is aimed so as to allow its capturing of centered images of individual 216. Further, this angling of camera 214 serves to avoid capturing the bright light of projector 212 in field of view 242 of camera 214.

Projectors 210 and 212 are located opposite of projection screens 208 and 206, respectively. Additionally, projectors 210 and 212 are located on top of blocks 226 and 228, respectively. Accordingly, this mounting of projectors 210 and 212 allows projectors 210 and 212 to not be off-angle from projection screens 208 and 206, respectively, thereby reducing "keystoning" of the projected images. In other words, optical axis 240 of projectors 210 and 212 are approximately perpendicular to projection screens 208 and 206, respectively.

Figure 3:
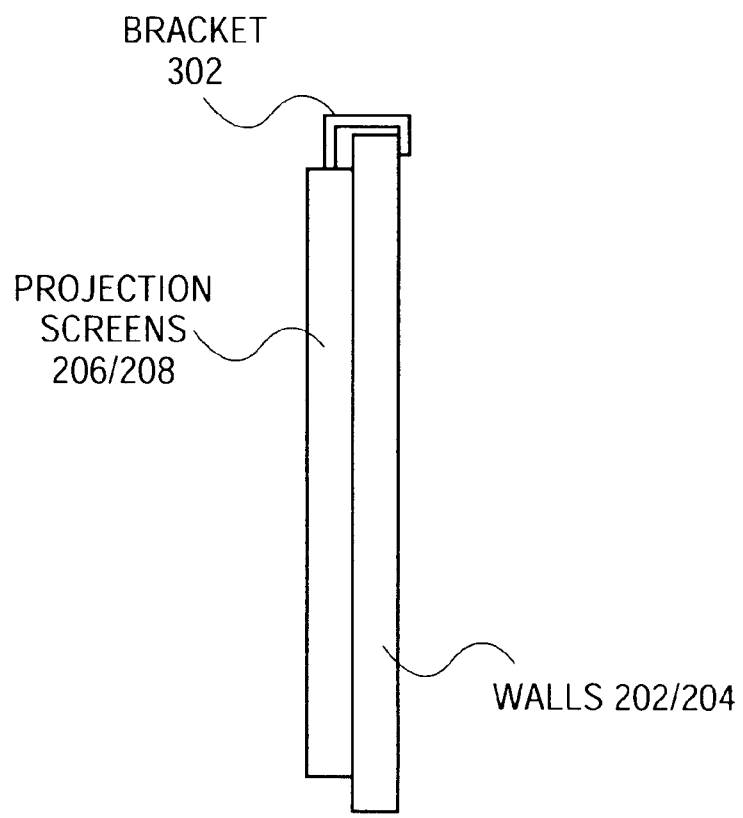
FIG. 3 illustrates the hanging of projection screens 206/208 onto walls 202/204, according to one embodiment of the present invention.

Moreover, FIG. 3 illustrates the hanging of projection screens 206/208 onto walls 202/204, according to one embodiment of the present invention. As shown, projection screens 206/208 are hung to walls 202/204 employing bracket 302, thereby allowing for ease of installation and removal.

Figure 4:
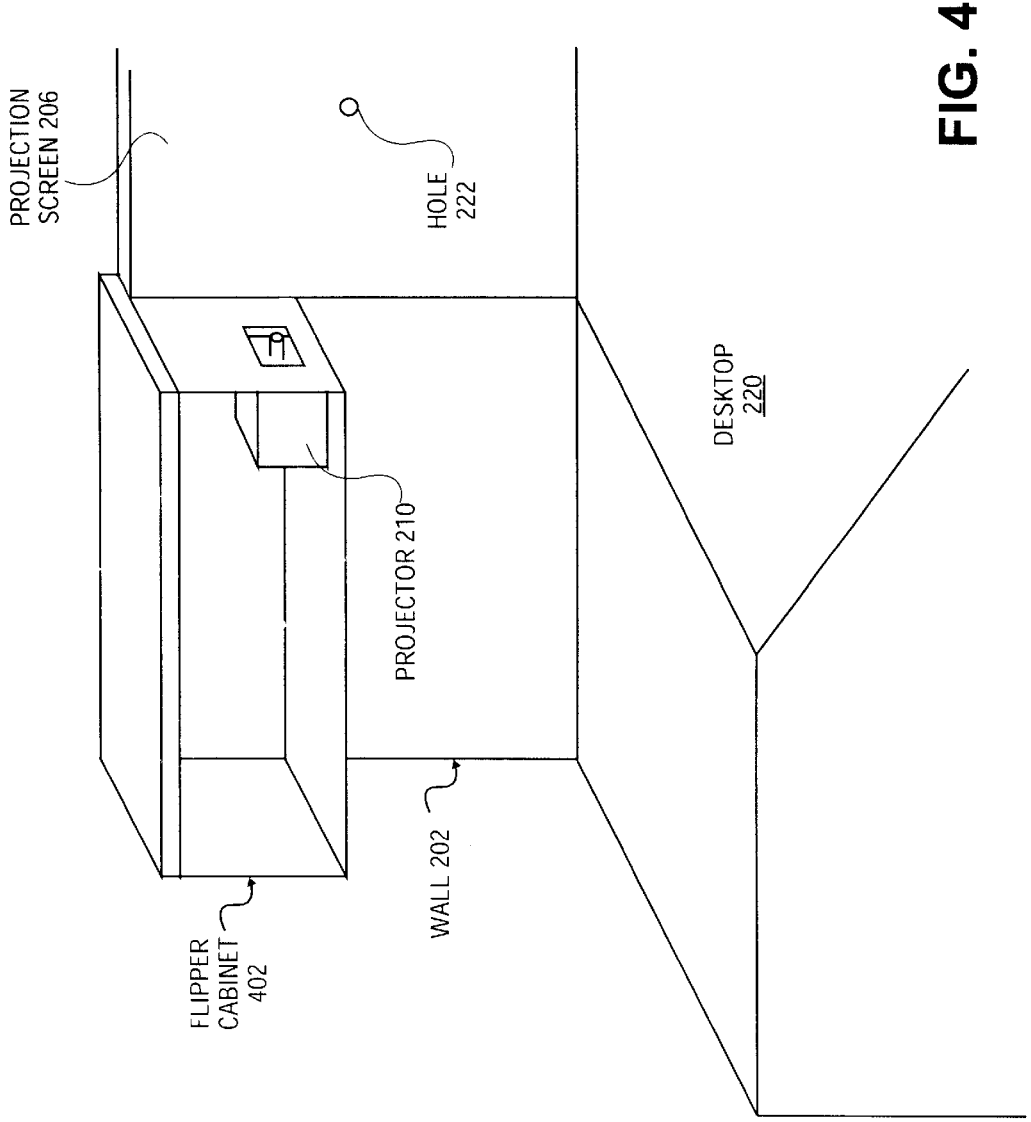
FIG. 4 illustrates a side view of workspace 200 of FIGS. 2a–2b wherein flipper cabinets are employed to house the projectors, according to one embodiment of the present invention.

Alternatively, FIG. 4 illustrates a side view of workspace 200 of FIGS. 2a–2b wherein flipper cabinets are employed to house the projectors, according to one embodiment of the present invention. Flipper cabinets are those cabinets mounted on the wall and above the desktop area of the cubicle, which are typically employed to store books, notebooks, etc. For sake of clarity, FIG. 4 illustrates only projector 210 being stored in flipper cabinet 402, which is mounted on wall 202 above desktop 220. However, the embodiment shown in FIG. 4 also applies to the storage of projector 212 in an additional flipper cabinet on wall 204 on the opposite side of workspace 200. Accordingly, projectors 210–212 are not on desktop 220, thereby leaving more desk surface area available for user activities. However, the embodiments of the invention are not limited to those illustrated in FIGS. 2a–2b and 4. For example, projectors 210–212 can be mounted on their own stands within workspace 200 or attached to the bottom of flipper cabinet 402.

Moreover, FIGS. 5a–5c illustrate another embodiment for placement of projectors 210 and 212. As shown, projector 210 is housed on projector tray 502, wherein the projector tray 502 is supported by support 508 as well as cables 510 and 512, which are attached to wall 202. Additionally, turnbuckles 504 and 506 along cables 510 and 512 provides for adjustable of such cables to thereby allow for adjustability of the location of projector 210. In an embodiment, this type of housing can be located in front of flipper cabinets within workspace 200 in reference to the projection screens to which the projectors project. Accordingly, this embodiment allows for more space within the flipper cabinets for traditional storage needs for workspace 200. The embodiment illustrated in FIGS. 5a–5c is described with regard to projector 210; however such embodiment also applies to projector 212.

Figure 6A:
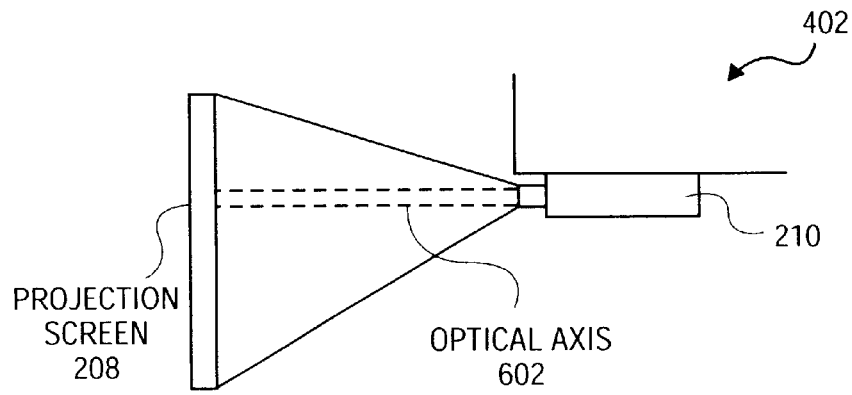
FIGS. 6a–6d illustrate embodiments of different locations for projectors 210 and 212.
Figure 6B:
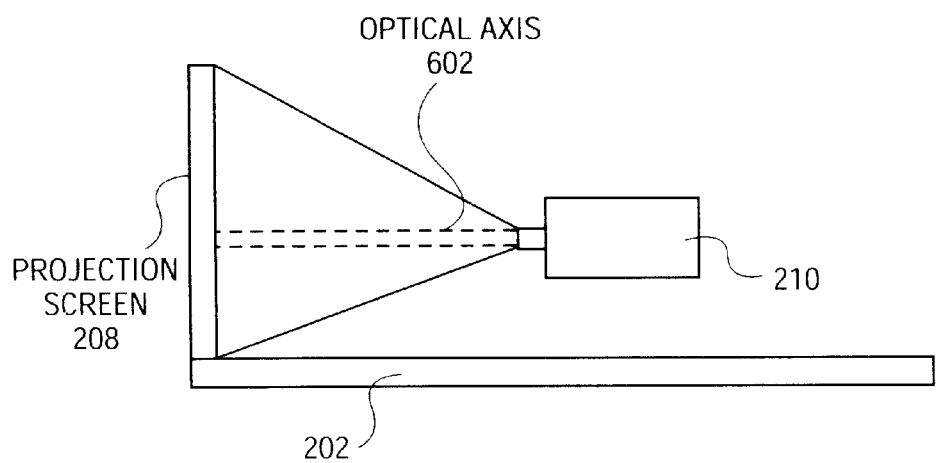

Additionally, FIGS. 6a–6d illustrate embodiments of different locations for projectors 210 and 212. As shown, FIGS. 6a–6b illustrate a side view and a top view, respectively, of an embodiment of a location of projector 210. In particular, projector 210 is located below a flipper cabinet of workspace 200 and close to wall 202. As shown in FIG. 6a, optical axis 602 of projector 210 is centered approximately in the middle of projection screen 208. Accordingly, the projection from projection 210 is approximately symmetrical. Moreover, as shown in FIG. 6b, optical axis of projector 210 is not centered in the middle of projection screen 208. Rather, projector 210 is closer to the end of projection screen 208 that is near wall 202. Therefore, the projection from projector 210 is asymmetrical. However, with adjustments to projector 210 the projection onto projection screen 208 still covers projection screen 208. Accordingly, this embodiment moves projector 210 further from the user of workspace 200, thereby reducing the heat and noise level associated with projector 210 that the user of workspace 200 may experience.

Figure 6C:
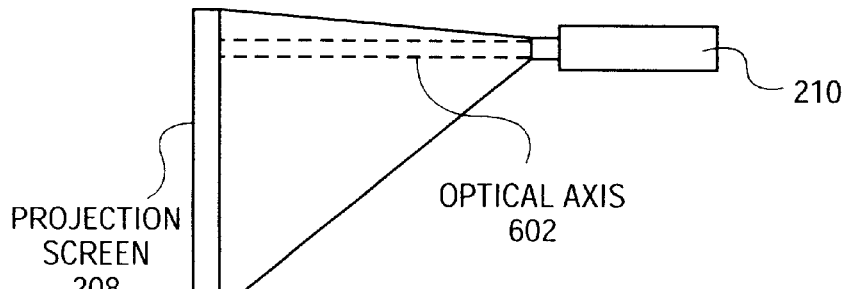
Figure 6D:
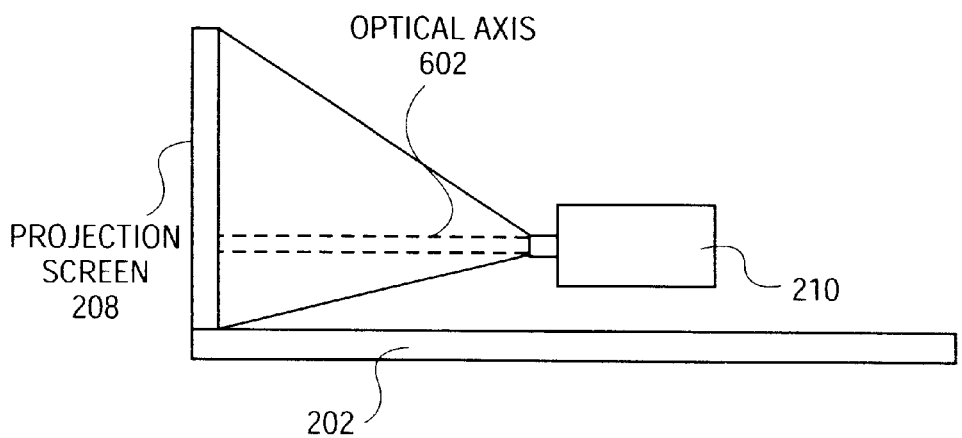

As shown, FIGS. 6c–6d illustrate a side view and a top view, respectively, of another embodiment of a location of projector 210. In particular, projector 210 is located higher above the ground level in workspace 200 than the embodiment illustrated in FIGS. 6a–6b. In one such embodiment, projection 210 may be located within the flipper cabinets of workspace 200. As shown in FIG. 6c, optical axis 602 is closer to the top of projection screen 208 than the embodiment illustrated in FIG. 6a. Therefore, the projection from projector 210 is asymmetrical. Moreover, as shown in FIG. 6d, optical axis 602 is not centered in the middle of projection screen 208. Rather, projector 210 is closer to the end of projection screen 208 that is near wall 202. Therefore, the projection from projector 210 is asymmetrical. However, with adjustments to projector 210 the projection onto projection screen 208 still covers projection screen 208. Accordingly, this embodiment also moves projector 210 further from the user of workspace 200, thereby reducing the heat and noise level associated with projector 210 that the user of workspace 200 may experience. The embodiments illustrated in FIGS. 6a–6d are described with regard to projector 210; however such embodiment also applies to projector 212.

Workspace 200 also includes frontal-view camera 214 located behind hole 222 of projection screen 206. In one embodiment, hole 222 is approximately a quarter-inch in diameter. In an embodiment, a thin gauze-like mesh covers hole 222, thereby reflecting portions of the light incident from projector 212 and reducing the visibility of hole 222 to the user. The location of the mesh gauze in reference to the camera lens of frontal-view camera 214 precludes the mesh gauze from being in the focal plane of the camera lens of frontal-view camera 214. In one embodiment, the focal plane of frontal-view camera 214 is approximately one meter away from its camera lens. Therefore, because the thin gauze-like mesh is out of the focal plane of the lens of frontal-view camera 214, this thin gauze-like mesh has minimal effect on the images captured by the lens of frontal-view camera 214. Moreover, in additional embodiments, other partially transmissive layers or screening can be employed as a cover for hole 222.

In one embodiment, a telephoto lens is incorporated into frontal-view camera 214. In one such embodiment, the telephoto lens has a focal length of approximately 8 millimeters (mm) with a narrow field of view to minimizes the amount of light captured from the projection from projector 212. In an embodiment, an approximately one-third inch charge couple device (CCD) sensor is coupled to frontal-view camera 214 to convert the image captured by frontal-view camera 214 into a bit stream to be transmitted to the computer coupled thereto. The incorporation of a telephoto lens into frontal-view camera 214 produces near optimal facial perspective, thereby avoiding the fish-eye distortion apparent with wide-angle lenses that are typically used in monitor top video conferencing cameras. In particular, the use of wide angle lenses typically produce large noses and distorted faces in the images of individuals, which the lenses capture.

Figure 7:
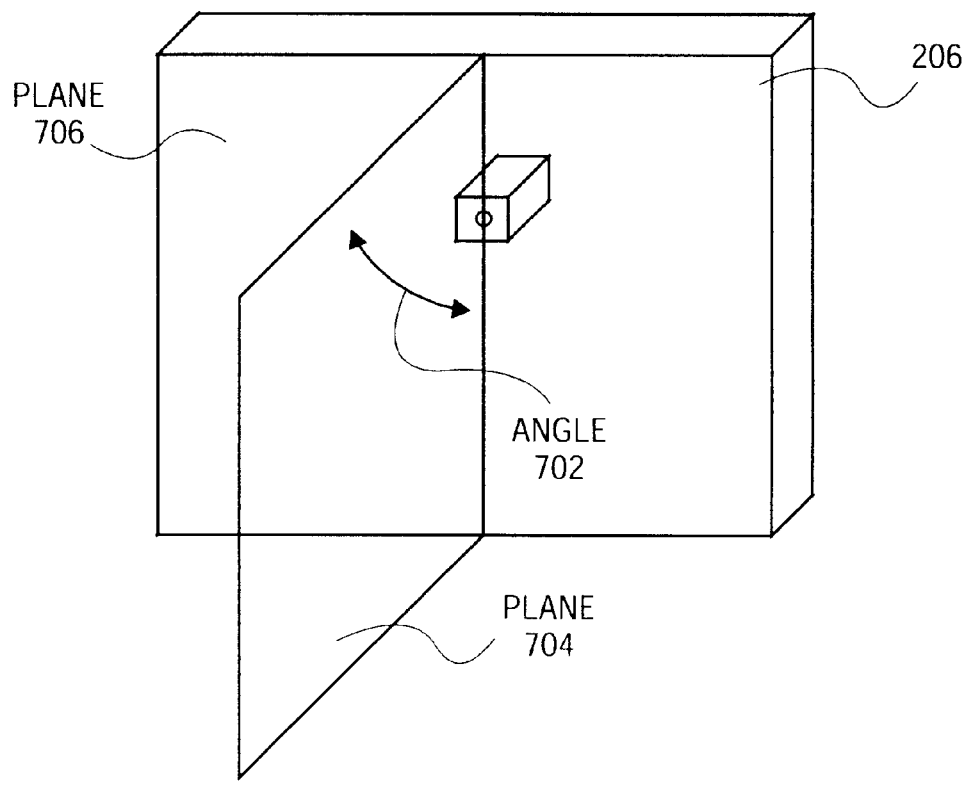
FIG. 7 illustrates an angle between the plane of capture for frontal-view camera 214 and the plane of the front side of projection screen 206, according to one embodiment of the invention.

FIG. 7 illustrates an angle between the plane of capture for frontal-view camera 214 and the plane of the front side of projection screen 206, according to one embodiment of the invention. As shown in FIG. 7, frontal-view camera 214 is mounted behind projection screen 206 such that the angle between the plane of capture for frontal-view camera 214 and the plane of the front side of projection screen 206 are not perpendicular. In particular, plane 704 is the plane of capture for frontal-view camera 214, and plane 706 is the plane of the front side of projection screen 206 such that angle 702, which is the angle between plane 704 and plane 706, is not perpendicular. Accordingly, this reduces the amount of light from the image projected onto projection screen 206 captured by the camera lens of frontal-view camera 214. Therefore, this embodiment illustrated in FIG. 7 also contributes to the avoidance of capturing light from projector 212 by the camera lens of frontal-view camera 214.

Figure 8:
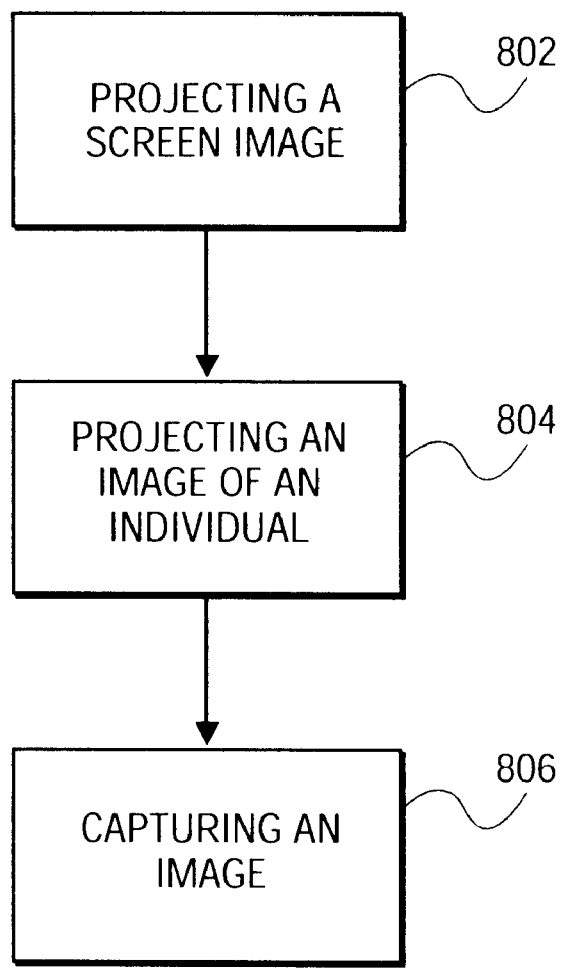
FIG. 8 is a flowchart illustrating a method of operation of workspace 200, according to one embodiment of the invention.

FIG. 8 is a flowchart illustrating a method of operation of workspace 200, according to one embodiment of the invention. In particular, in conjunction with workspace 200 of FIGS. 2a–2b, the operation of workspace 200 in accordance with embodiments of the invention will be described with reference to the flow chart shown in FIG. 8.

Projectors 210–212 project images onto projection screens 208 and 206, respectively. In particular, projector 210 projects a screen image for a computer used in conjunction with workspace 200 onto projection screen 208 at block 802. Accordingly, this projection of the screen image of the computer onto projection screen 208 increases the amount of desktop space within workspace 200, as a computer monitor is not needed to view such a screen image. Moreover, such a projection increases the viewing area for the screen image, thereby allowing user 216, for example, to work with an increased number of applications at one time with reduced manipulation of windows within projectors 210–212.

Projector 212 projects an image of an individual outside of workspace 200 (hereinafter "the outside individual") onto projection screen 206 at block 804. For example, individual 216 and the outside individual with a similar office setup could be involved in a videoconference wherein the image of the outside individual is projected onto projection screen 206. Moreover, in one embodiment, these two individuals share the screen image projected onto projection screen 208 using, for example, different types of shared application software, thereby allowing either individual to modify or update the user interface of the screen image for the computer(s) associated with the screen image.

Figure 9:
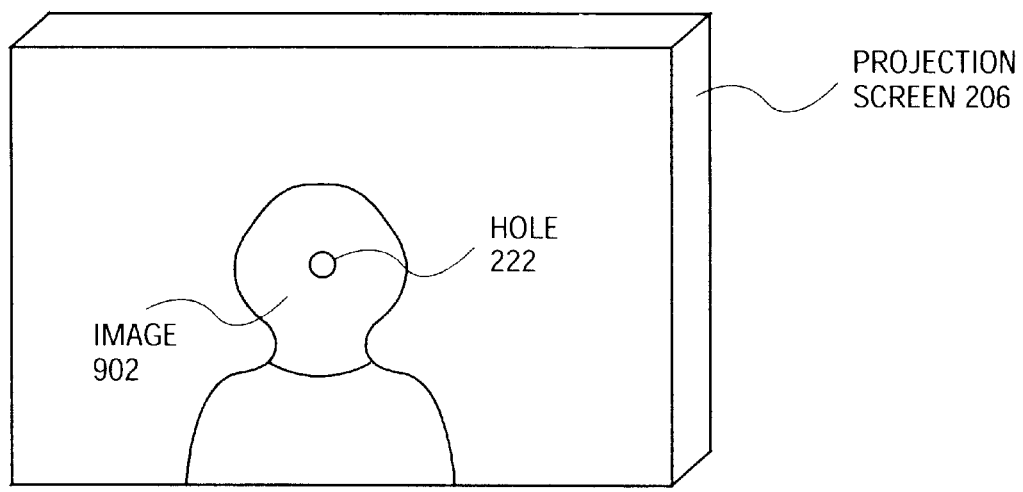
FIG. 9 illustrates a screen image on projection screen 206 during video conferencing, according to one embodiment of the invention.

Frontal-view camera 214 captures full frontal images of user 216 at block 806. In one embodiment, these captured images are used when user 216 is involved in a videoconference. FIG. 9 illustrates a screen image on projection screen 206 during video conferencing, according to one embodiment of the invention. In particular, FIG. 9 illustrates one embodiment of projection screen 206 during a videoconference between individual 216 and the outside individual, whose image, image 902, is projected onto projection screen 206. Moreover, image 902 is projected onto projection screen 206 such that hole 222 is near the eyes of image 902 of the outside individual.

Accordingly, the positioning of hole 222 as well as frontal-view camera 214 enable accurate eye contact and gaze awareness between individual 216 and the outside individual. In particular, as individual 216 is viewing image 902, a direct frontal-view image of individual 216 is being captured by frontal-view camera 214 through hole 222. In other words, individuals involved in such a videoconference are having eye-to-eye contact. Further, the scale of projection screen 206 enables projection of image 902 at human scale and typical interpersonal distances, both of which improve the realism of the interaction; in contrast, to videoconferencing via a typical computer monitor wherein the images of individuals are small and without eye contact due to the size of such a monitor and the placement outside the screen area of frontal-view camera 214, respectively.

In one embodiment of the present invention incorporating the videoconferencing and shared-work space capability, assuming that, as illustrated in FIGS. 2a–2b, that shared workspace is to the right of individual 216 and the image of the outside individual is to the left of individual 216, in order to produce accurate gaze awareness and eye contact in the outside individual's workspace, the outside individual should have the view of individual 216 on the projection screen to their right and the view of the shared workspace to their left. Accordingly, when individual 216 looks at the shared workspace to his right, it will appear to the outside individual that individual 216 is looking at the shared workspace on projection screen 208 in the outside individual's workspace, which will be on the outside individual's left.

Similarly, in order to produce accurate gaze awareness and eye contact in workspace 200, individual 216 should have the view of the outside individual on projection screen 206, which is to the left, and the view of the shared workspace on projection screen 208, which is to the right. Therefore, when the outside individual looks at the shared workspace to his left, it will appear to individual 216 that the outside individual is looking at the shared workspace on the opposing projection screen, which will be to the left of individual 216. Embodiments of the present invention are not limited to the projected images described above. For example, the two images on projection screens 210–212 could be switched. Moreover, in one embodiment, computer 224 creates a mirror image of the outside individual in the videoconference to remove the requirement that the two offices have complement placements of cameras.

Figure 10A:
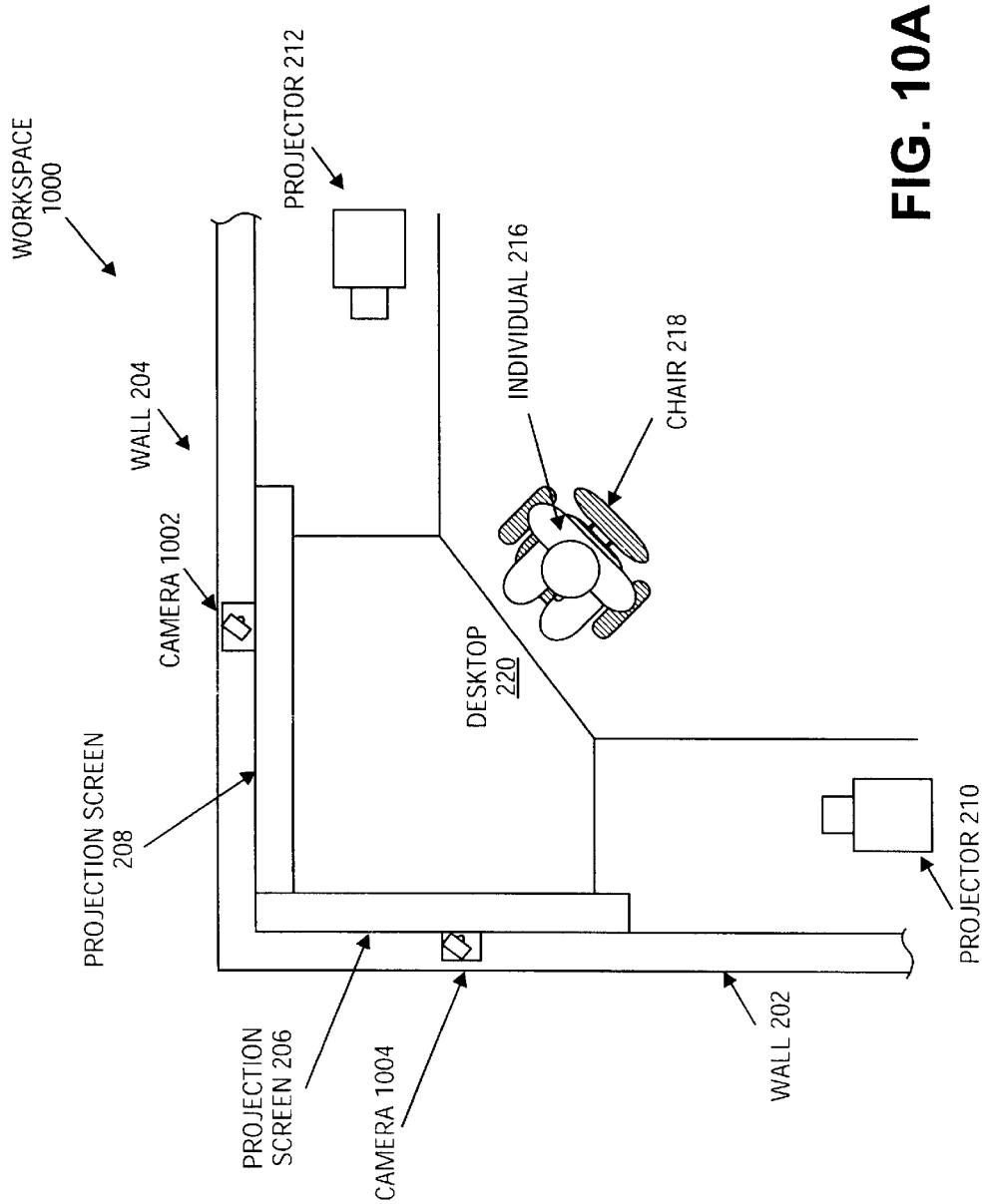
FIGS. 10a–10b illustrate a top-view and a side-view, respectively, of an alternative embodiment to workspace 200, according to one embodiment of the invention.
Figure 10B:
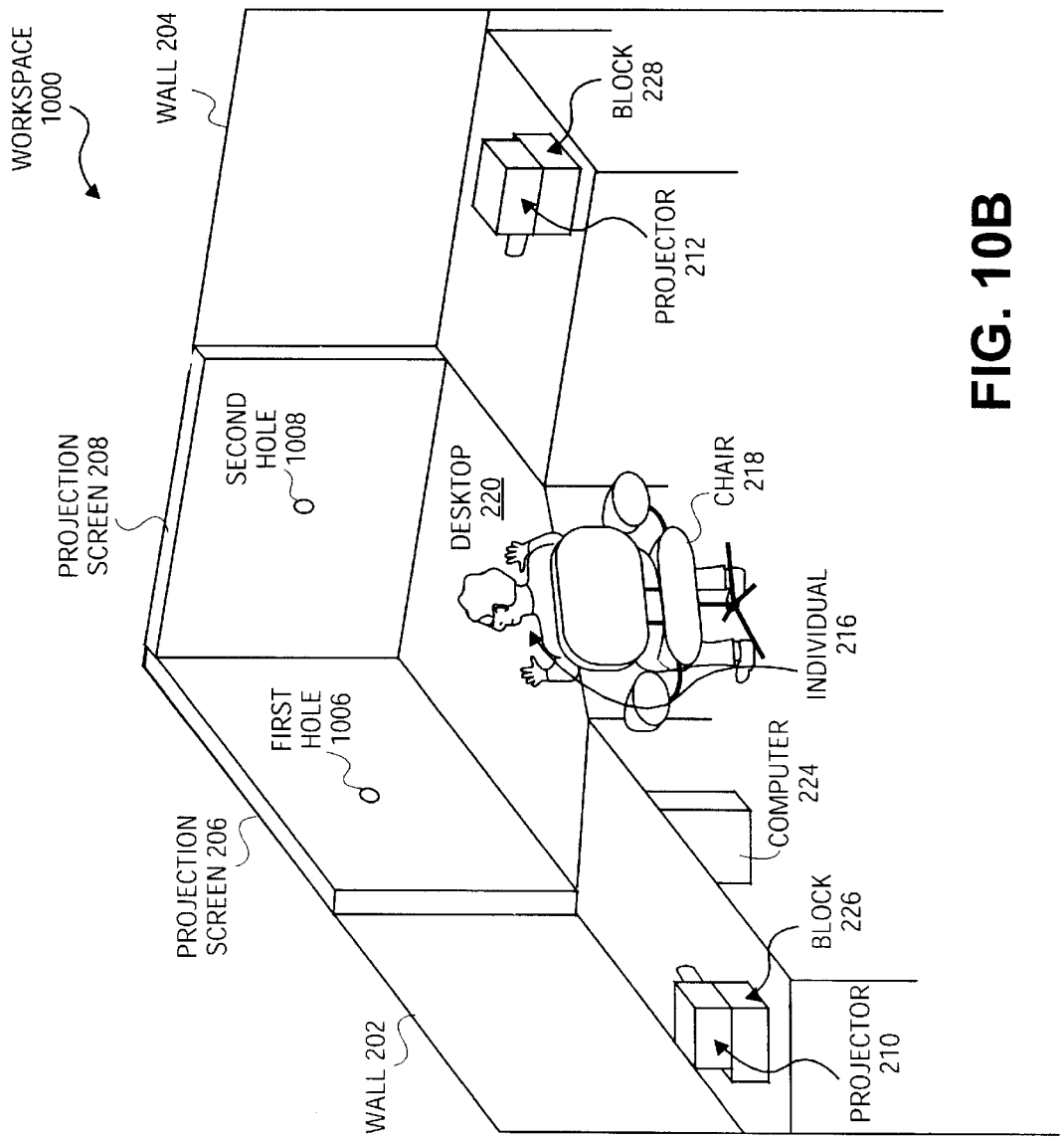

Moreover, FIGS. 10a–10b illustrate a top-view and a side-view, respectively, of an alternative embodiment to workspace 200, according to one embodiment of the invention. In particular, FIGS. 10a–10b illustrates a top-view and a side-view, respectively of workspace 1000 with individual 216 sitting in chair 218 and using workspace 1000. Similar to workspace 200, workspace 1000 includes walls 202 and 204, projection screens 206 and 208, projectors 210 and 212, desktop 220 and computer 224. Workspace 1000 also includes first frontal-view camera 1004, second frontal-view camera 1002. Moreover, projection screen 206 includes first hole 1006, and projection screen 208 includes second hole 1008. Computer 224 is coupled to and communicates with projectors 210 and 212, first frontal-view camera 1004 and second frontal-view camera 1002 through, for example, parallel, serial or other types of communications, that are known in the art. In one embodiment, desktop 220 also displays a screen image of computer 224 from a projector overhead (not shown), which is described in more detail below.

Projection screens 206 and 208 are mounted onto walls 202 and 204, respectively. Moreover, first frontal-view camera 1004 is located in a niche in wall 202 behind projection screen 206, wherein the camera lens of first frontal-view camera 1004 is behind first hole 1006 of projection screen 206. In particular, the camera lens of first frontal-view camera 1004 is positioned so as to allow its capturing of images of individual 216. Similarly, second frontal-view camera 1002 is located between wall 204 and projection screen 208, wherein the camera lens of second frontal-view camera 1002 is behind second hole 1008 of projection screen 208. In particular, the camera lens of second frontal-view camera 1002 is positioned so as to allow its capturing of images of individual 216.

Projectors 210 and 212 are located opposite of projection screens 208 and 206, respectively. Additionally, projectors 210 and 212 are located on top of blocks 226 and 228, respectively. Accordingly, this mounting of projectors 210 and 212 allow projectors 210 and 212 to not be off-angle from projection screens 208 and 206, respectively, thereby reducing "keystoning" of the projected images. Additionally, workspace 1000 can include flipper cabinets to house projectors 210 and 212 in another embodiment of the invention, as illustrated in FIG. 4.

Figure 11:
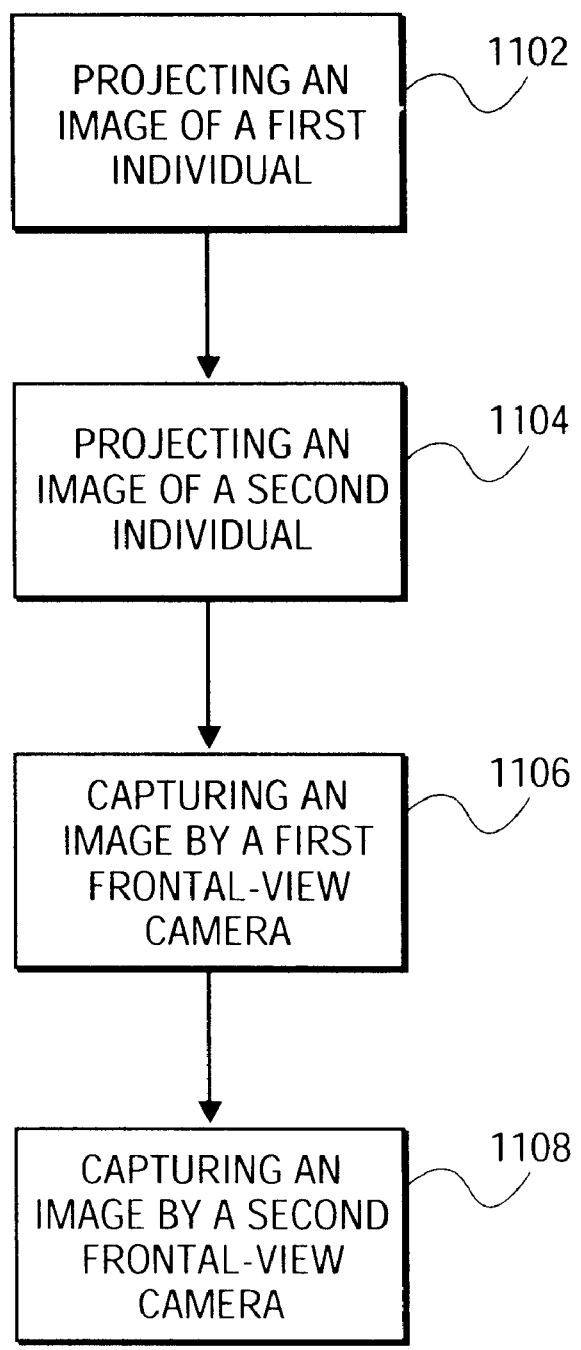
FIG. 11 is a flowchart illustrating a method of operation of workspace 1000, according to one embodiment of the invention.

FIG. 11 is a flowchart illustrating a method of operation of workspace 1000, according to one embodiment of the invention. In particular, in conjunction with workspace 1000 of FIGS. 10a–10b, the operation of workspace 1000 in accordance with embodiments of the invention will be described with reference to the flow chart shown in FIG. 11.

Projector 210 projects an image of a first individual outside of workspace 1000 (hereinafter "the first outside individual") onto projection screen 208 at block 1102.

Additionally, projector 212 projects an image of a second individual outside of workspace 1000 (hereinafter "the second outside individual") onto projection screen 206 at block 1104. Accordingly, in one embodiment, individual 216, the first outside individual and the second outside individual could be involved in a videoconference wherein the images of the first and second outside individuals are projected onto projection screens 208 and 206, respectively.

First frontal-view camera 1002 captures full frontal images of user 216 at block 1106. In one embodiment, the screen image of the first outside individual on projection screen 208 is illustrated in FIG. 9, thereby allowing for correct gaze awareness and eye-to-eye contact between individual 216 and the first outside individual, as described above in conjunction with FIG. 9. Similarly, second frontal-view camera 1004 captures full frontal images of user 216 at block 1108. In one embodiment, the screen image of the second outside individual on projection screen 206 is illustrated in FIG. 9, thereby allowing for correct gaze awareness and eye-to-eye contact between individual 216 and the second outside individual, as described above in conjunction with FIG. 9.

Moreover, workspace 1000 is configurable to enable the projection of a screen image of a computer onto projection screen 206 and/or 208. Accordingly, workspace 1000 can provide for three-way videoconferencing, two-way videoconferencing or no videoconferencing w/multiple screen images on projections screens 206 and 208.

Figure 12:
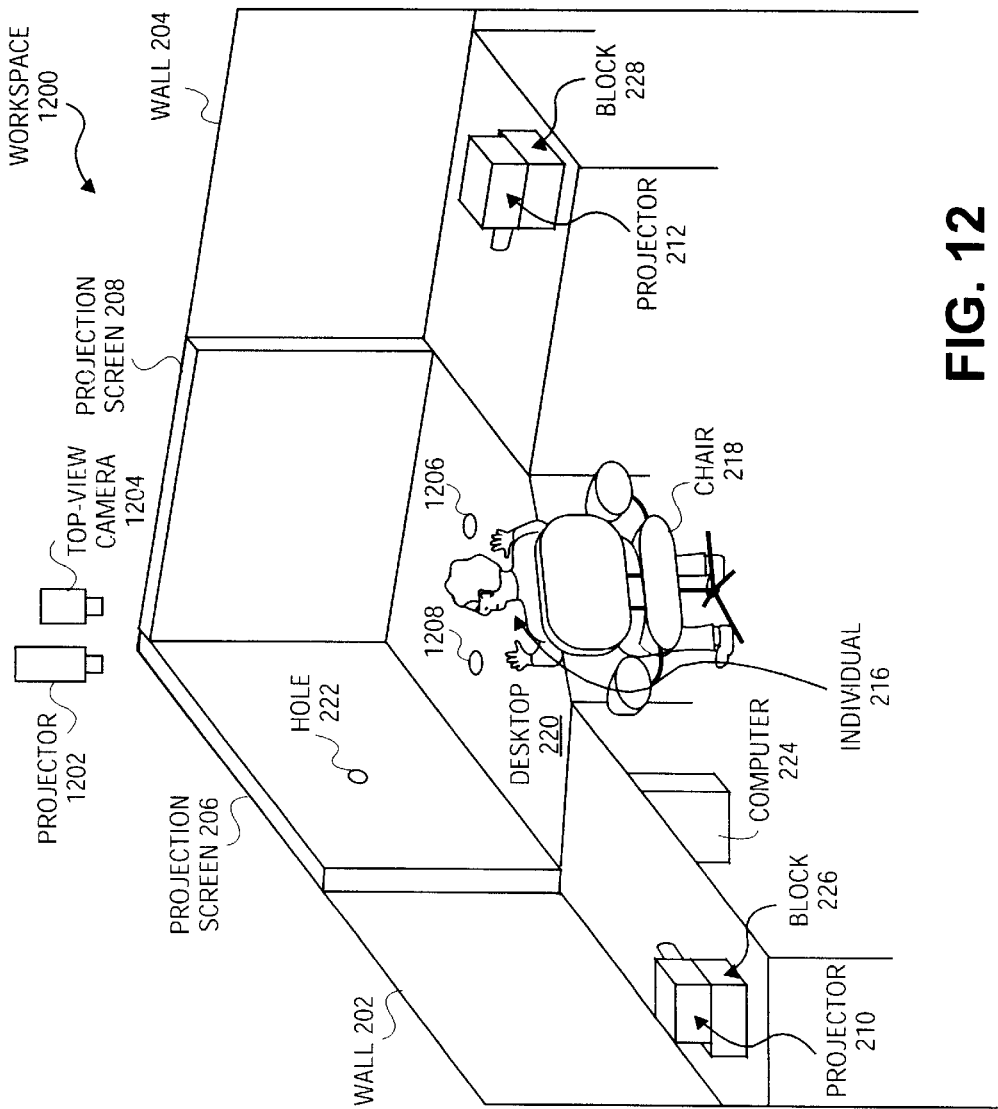
FIG. 12 shows a side-view of a workspace, according to another embodiment of the invention.

FIG. 12 show a side-view of a workspace, according to another embodiment of the invention. In particular, FIG. 12 illustrates a workspace that enables body gesture interaction with the user interface (UI) through a screen image of computer 224. In addition to the components illustrated in FIGS. 2a–2b and 10a–10b, FIG. 12 includes projector 1202, top-view camera 1204, first virtual control 1206 and second virtual control 1208. FIG. 12 includes two virtual controls for sake of clarity and not by way of limitation, as a lesser or greater numbers of virtual controls may be used in conjunction with embodiments of the present invention.

Top-view camera 1204 captures body movements generally from, for example, individual 216. Moreover, top-view camera 1204 captures virtual controls 1206 and 1208 and their relationship to body movements within the area of desktop 220. Additionally, the workspace of FIG. 12 includes projector 1202, which projects a screen image of computer 224, which includes virtual controls 1206 and 1208, onto desktop 220. In particular, virtual controls 1206 and 1208 are visual objects that enable computer visual recognition of body-activated controls for controlling the user-interface (UI) of computer 224. For example, in one embodiment, first virtual control 1206 represents an icon that is associated with an application for the user interface. Accordingly, a body movement on first virtual control 1206 activates the application associated therewith. One example of a body movement includes a hand movement. Therefore, top-view camera 1204 captures body movements as well as such movements in relationship to virtual controls 1206 and 1208 and transmits these images to computer 224 for manipulating of the UI for computer 224. Embodiments of FIG. 12 were described in terms of manipulating the UI of computer 224. However, embodiments of the invention are not so limited, as projector 1202 and top-view camera 1204 can be employed to manipulate the UI of other computers couple thereto.

Figure 13:
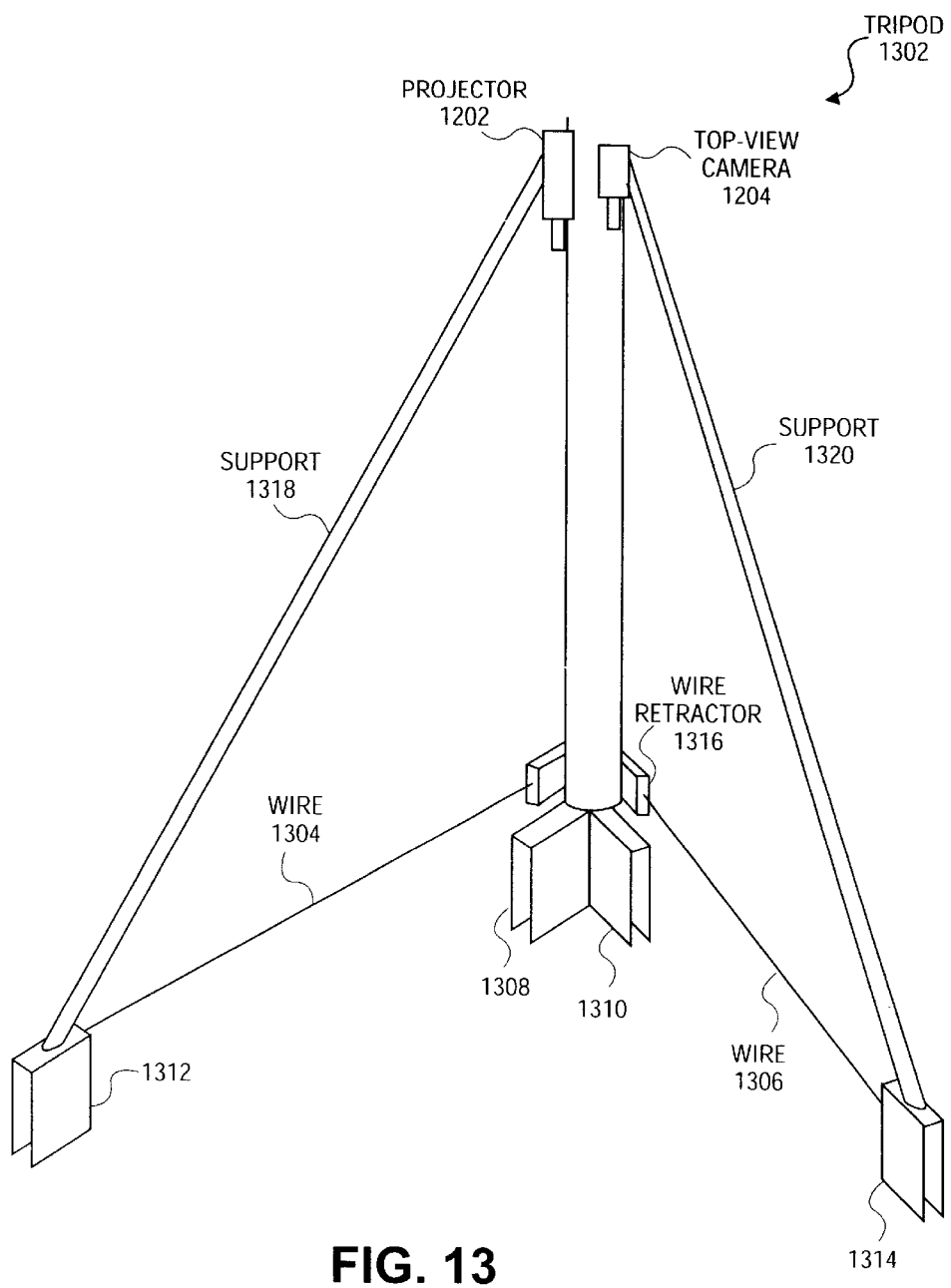
FIG. 13 illustrates a tripod for the mounting of projector 1202 and top-view camera 1204, according to embodiments of the present invention.

Moreover, FIG. 13 illustrates a tripod for the mounting of projector 1202 and top-view camera 1204, according to embodiments of the present invention. In particular, tripod 1302 includes supports 1318–1320, wires 1304–1306, wire retractor 1316 and brackets 1308–1314. As shown, brackets 1308–1314 enable the mounting of tripod 1302 onto the top of walls 202–204. Moreover, wires 1304–1306 provide for support as well as ease of storage, transport and installation of tripod 1302. In particular, wire retractor 1316 in conjunction with wires 1304–1306 allows for ease of retractability of supports 1318–1320. However, embodiments of the present invention are not so limited as wires 1304–1306 could be replaced by supports similar to supports 1318–1320.

Figure 14:
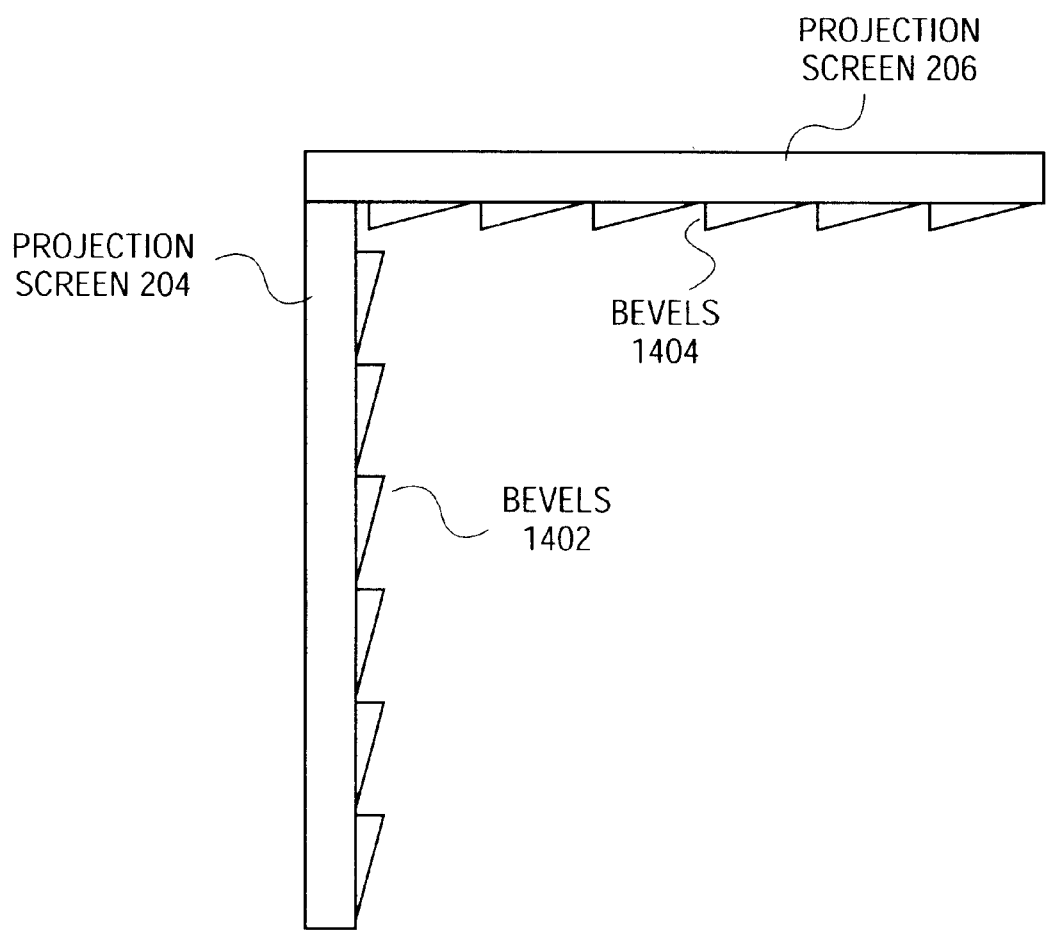
FIG. 14 illustrates projection screens 204 and 206 of FIG. 2, according to one embodiment of the present invention.

FIG. 14 illustrates projection screens 204 and 206 of FIG. 2, according to one embodiment of the present invention. In particular, FIG. 14 illustrates a top-view projection screens 204 and 206, which include bevels 1402 and 1404, respectively.

As illustrated, bevels 1402 and 1404 are small modifications along the projection surface of projection screens 204 and 206. Due to the angle of bevels 1402 and 1404, the incoming light is not reflected back uniformly from projection screens 204 and 206.

Figure 15A:
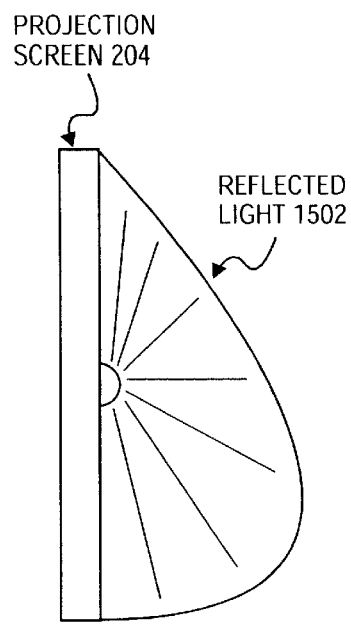
FIGS. 15a and 15c are top-views of the reflected light from projection screens 204 and 206 with bevels in the projection surfaces, respectively.
Figure 15B:
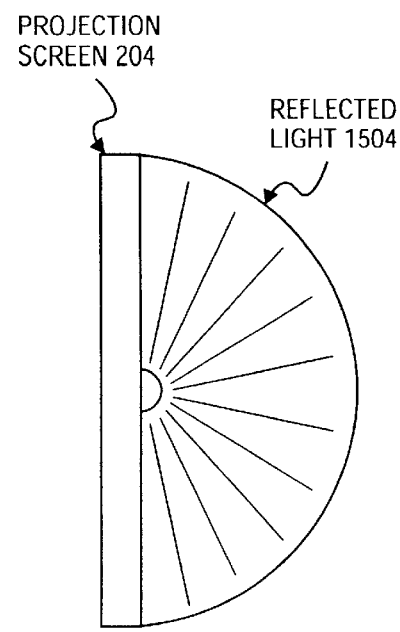
FIGS. 15b and 15d are top-views of the reflected light from projection screens 204 and 206 without bevels in the projection surfaces, respectively.
Figure 15C:
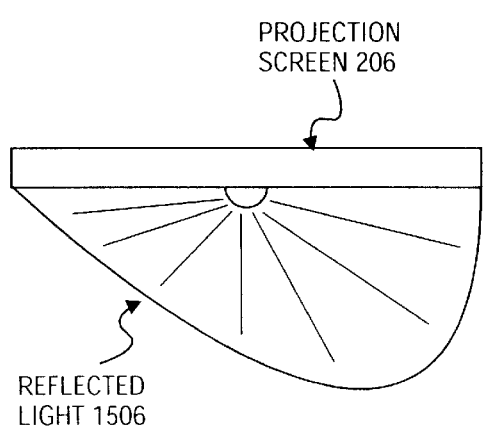
Figure 15D:
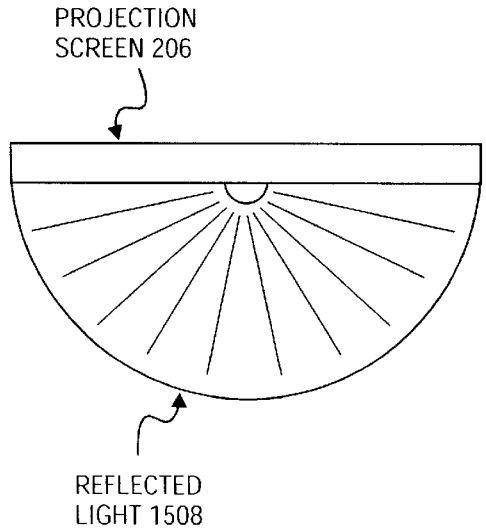

In particular, FIGS. 15a and 15c are graphs of top–views of the reflected light intensity as a function of viewing angle from projection screens 204 and 206 with bevels in the projection surfaces, respectively. FIGS. 15b and 15d are graphs of top-views of the reflected light intensity as a function of viewing angle from projection screens 204 and 206 without bevels in the projection surfaces, respectively. FIG. 15a illustrates that reflected light 1502 is not uniformly distributed from the projection surface, as more of the reflected light is reflected to the left of projection screen 204 when facing such the projection screen. In contrast, FIG. 15b illustrates that reflected light 1504 is approximately uniformly distributed from the projection surface without the introduction of the bevels into the projection surface.

Similarly, FIG. 15c illustrates that reflected light 1506 is not uniformly distributed from the projection surface, as more of the reflected light is reflected to the right of projection screen 206 when facing such the projection screen. In contrast, FIG. 15d illustrates that reflected light 1508 is approximately uniformly distributed from the projection surface without the introduction of the bevels into the projection surface. Accordingly, this introduction of bevels into the projection surface reduces the ambient light level of the opposing projection screen as the reflected light from projection screens 204 and 206 are reflected away from the opposing projection screen. In particular, with the introduction of bevels into the projection surface, the projection surfaces of projection screens 204 and 206 are not equally diffusive in all directions.

Therefore, without the bevels, portions of the opposing projection screen are lightened, especially in the corners of the projection screen coupled to the opposing projection screen, thereby making the darker portions of the projected image brighter and causing the projected image to lose contrast in these areas.

Returning to FIGS. 2a–2b, 10a–10b and 12, when projection screens 206, projection screen 208 and/or desktop 220 are employed to display screen images of computer 224, the distance between different objects of the screen image is often great. For example, individual 216 may have to move a mouse pointer from the bottom of desktop 220 to the top of projection screen 206. Accordingly, in one embodiment, an abstraction of the screen image is placed in a convenient location for individual 216 to access. In other words, a smaller representation of the screen image is placed in a convenient location within the larger screen images projected onto projection screen 206, projection screen 208 and/or desktop 220 or onto a touch panel display adjacent to the keyboard of the computer. For example, in one embodiment, the abstraction is placed on the bottom right side of desktop 220.

Moreover in another embodiment of FIGS. 2a–2b, 10a–10b and 12, frontal-view cameras 214, 1002 and 1004 are employed to assist in locating a mouse pointer within screen image(s) of a computer displayed on projection screen 206, projection screen 208 and/or desktop 220. For example, returning to FIGS. 10a–10b, when projection screen 206 and projection screen 208 have screen images of a computer displayed thereon, locating the mouse pointer can be difficult due to the amount of screen area.

Therefore, to help locate the mouse pointer, individual 216 directs their gaze to either frontal-view camera 1002 or frontal-view camera 1004 and presses a button coupled to computer 224 through for example a serial, parallel or other type of connection. Upon pressing the button, a processing unit within or coupled to computer 224 determines where individual 216 is gazing and places the mouse pointer in a location on the projection screen which includes the frontal-view camera to which the individual is gazing. In one such embodiment, the location on the projection screen is the middle of such projection screen. For example, if individual 216 is gazing at first frontal-view camera 1002, when the button is pressed, the processing unit would cause the mouse pointer to be placed in a location of the screen image projected on projection screen 208.

In one embodiment, such instructions executing on a processing unit of computer 224 employ imaging software that performs comparisons between images to determine if such images match. For example, individual 216 could set up these "locating of a mouse pointer" application by gazing at frontal-view cameras 1002–1004 and informing such instructions when individual 216 is gazing at a particular camera. For example, computer 224 would capture the image of individual 216 when individual 216 is gazing at first frontal-view camera 1002 and stores this image as a frontal view for first frontal-view camera 1002. During subsequent operations to locate the mouse pointer, computer 224 would compare this stored image to the image captured when individual 216 presses the button to locate the mouse pointer. The images are considered a match based on, for example, the location of the eyes of individual 216 and/or the shape of the head of individual 216.

Computer 224 as well as computer coupled thereto include machine-readable mediums on which is stored a set of instructions, such as software, embodying any one, or all, of the methodologies described above. Software can reside, completely or at least partially, within a memory and/or within a processing unit of computer 224 or computer coupled thereto. For the purposes of this specification, the term "machine-readable medium" shall be taken to include any mechanism that provides, stores and/or transmits information in a form readable by a machine, such as a computer. For example, a machine-readable medium includes read only memory (ROM); random access memory (RAM); magnetic disk storage media; optical storage media; flash memory devices; electrical, optical, acoustical or other form of propagated signals. Examples of such signals include carrier waves, infrared signals and digital signals.

Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. An apparatus comprising:
   a projection screen located on a wall of a workspace;
   a projector to project an image of an individual outside the workspace onto the projection screen; and
   a frontal-view camera located behind the projection screen, the frontal-view camera to capture a frontal-view image of a user of the workspace through a hole in the projection screen, the hole located within a face of the image of the individual, wherein a lens of the frontal-view camera is facing the user and wherein an optical axis of the frontal-view camera is not perpendicular to a plane of a front surface of the projector screen.

2. The apparatus of claim 1, wherein the hole in the projection screen is covered with a mesh gauze.

3. The apparatus of claim 1, wherein the frontal-view camera includes a telephoto lens having a focal length of approximately 8 millimeters for a charge couple device (CCD) sensor, wherein the CCD sensor is approximately one-third of an inch.

4. The apparatus of claim 1, wherein a projection surface of the projection screen includes bevels.

5. The apparatus of claim 1, wherein an optical axis of the projector is approximately perpendicular to the projection screen.

6. An apparatus comprising:
a first projection screen located on a first wall of a workspace;
a second projection screen located on a second wall of the workspace
a frontal-view camera located behind the second projection screen, the frontal view camera to capture a frontal view image of the workspace through a hole in the second projection screen; and
a first projector to project a screen image for a computer onto the first projection screen, wherein the first projector is located across from the first projection screen; and
a second projector to project an image of an individual outside the workspace such that the hole is located within the image of the individual, wherein the second projector is located across from the second projection screen.

7. The apparatus of claim 6, wherein the hole in the second projection screen is covered with a mesh gauze.

8. The apparatus of claim 6, wherein the first projector and the second projector are hung from a first flipper cabinet and a second flipper cabinet coupled to the first wall and the second wall, respectively.

9. The apparatus of claim 6, wherein the frontal view camera includes a telephoto lens having a focal length of approximately 8 millimeters.

10. The apparatus of claim 6, wherein the individual outside the workspace and an individual in the workspace can video teleconference using a communications link between the computer in the workspace and a computer that the individual outside the workspace is using.

11. The apparatus of claim 10, wherein the individual outside the workspace and the individual in the workspace share a user interface to an application program running on the computer that the individual outside the workspace is using or the computer in the workspace.

12. The apparatus of claim 6, wherein a projection surface of the first projection screen and a projection surface of the second projection screen include bevels.

13. An apparatus comprising:
a first projection screen located on a first wall of a workspace, the workspace having a desktop;
a second projection screen located on a second wall of the workspace
a frontal-view camera located behind the second projection screen, the frontal view camera to capture a frontal-view image of a user of the workspace through a hole in the second projection screen; and
a first projector to project a screen image for a computer onto the first projection screen, wherein the first projector is located across from the first projection screen; and
a second projector to project an image of an individual outside the workspace such that the hole is located within the image of the individual, wherein the second projector is located across from the second projection screen;
a top-view camera located above the workspace, the top-view camera to capture a top-view image of the desktop of the workspace; and
a third projector to project the screen image onto the desktop of the workspace, the screen image projected onto the desktop having virtual controls to control the computer, wherein the top-view image can include body gestures for controlling the virtual controls.

14. The apparatus of claim 13, wherein the body gestures control the computer independent of the virtual controls.

15. The apparatus of claim 13, wherein the virtual controls include an icon image representing an icon on the screen image for the computer, such that one body gesture of the body gestures activates an application associated with the icon, wherein the one body gesture is a body movement across the icon image.

16. The apparatus of claim 13, wherein a projection surface of the first projection screen and a projection surface of the second projection screen include bevels.

17. A method comprising:
projecting, onto a projection screen on a wall of a workspace, an image of an individual outside the workspace; and
capturing a frontal-view image of a user of the workspace using a camera, such that a lens of the camera is facing the user and is located behind a hole in the projection screen, wherein the hole is located within a face region of the image of the individual on the projection screen, wherein an optical axis of the camera is not perpendicular to a plane of a front surface of the projection screen.

18. The method of claim 17, wherein the hole in the projection screen is covered with a mesh gauze.

19. The method of claim 17, wherein the frontal-view camera includes a telephoto lens having a focal length of approximately 8 millimeters.

20. The method of claim 17, wherein the workspace includes an office cubicle.

21. A method comprising:
projecting, onto a first projection screen on a first wall of a workspace, a screen image of a computer;
projecting, onto a second projection screen on a second wall of the workspace, an image of an individual outside the workspace;
capturing a frontal-view image of the workspace using a camera such that a lens of the camera is located in a hole in the first projection screen, wherein the hole is located within the image of the individual on the first projection screen.

22. The method of claim 21, wherein the individual outside the workspace and an individual in the workspace can video teleconference using a communications link between the computer in the workspace and a computer that the individual outside the workspace is using.

23. The method of claim 21, wherein the individual outside the workspace and the individual in the workspace share a user interface for the computer that the individual outside the workspace is using or the computer in the workspace.

24. A method comprising:
projecting, onto a first projection screen on a first wall of a workspace, a screen image of a computer;
projecting, onto a second projection screen on a second wall of the workspace, an image of an individual outside the workspace;

capturing a frontal-view image of the workspace using a frontal-view camera, such that a lens of the frontal-view camera is located behind a hole in the first projection screen, wherein the hole is located within a face of the image of the individual on the first projection screen;

capturing a top-view image of a desktop of the workspace using a top-view camera; and projecting, onto the desktop of the workspace, the screen image of the computer, the screen image projected onto the desktop having virtual controls for controlling the computer, wherein the top-view image can include body gestures from an individual in the workspace for controlling the virtual controls.

25. The method of claim 24, the body gestures control the user interface of the computer independent of the virtual controls.

26. The method of claim 24, wherein the virtual controls include an icon image representing an icon on the screen image of the computer such that one body gesture of the body gestures activates an application associated with the icon, wherein the one body gesture is a body movement across the icon image.

27. A machine-readable medium that provides instructions, which when executed by a machine, cause said machine to perform operations comprising:

projecting, onto a first projection screen on a first wall of a workspace, a screen image of a computer;

projecting, onto a second projection screen on a second wall of the workspace, an image of an individual outside the workspace;

capturing a frontal-view image of a user of the workspace using a frontal-view camera, such that a lens of the frontal-view camera is located behind a hole in the first projection screen, wherein the hole is located within a face of the image of the individual on the first projection screen;

capturing a top-view image of a desktop of the workspace using a top-view camera; and projecting, onto the desktop of the workspace, the screen image of the computer, the screen image projected onto the desktop having virtual controls for controlling the computer, wherein the top-view image can include body gestures from an individual in the workspace for controlling the virtual controls.

28. The machine-readable medium of claim 27, further comprising:

capturing a gaze of the individual; and placing a mouse pointer of the screen image of the computer on a projection screen to which the individual is gazing.

29. The machine-readable medium of claim 27, wherein the body gestures control the user interface of the computer independent of the virtual controls.

* * * * *

UNITED STATES PATENT AND TRADEMARK OFFICE
CERTIFICATE OF CORRECTION

PATENT NO.    : 6,554,433 B1
DATED         : April 29, 2003
INVENTOR(S)   : Holler It is certified that error appears in the above-identified patent and that said Letters Patent is hereby corrected as shown below:

Column 8,
Line 65, before "projection", insert -- of --.

Signed and Sealed this

Second Day of December, 2003

JAMES E. ROGAN
*Director of the United States Patent and Trademark Office*